United States Patent [19]

McComber et al.

[11] Patent Number: 4,579,547
[45] Date of Patent: Apr. 1, 1986

[54] V-BELT

[75] Inventors: Donald R. McComber; John P. Frazier, both of Littleton, Colo.

[73] Assignee: The Gates Rubber Company, Denver, Colo.

[21] Appl. No.: 662,935

[22] Filed: Oct. 19, 1984

[51] Int. Cl.[4] .......................... F16G 5/12; F16G 1/14
[52] U.S. Cl. ..................................... 474/201; 474/242
[58] Field of Search ............... 474/201, 204, 206, 207, 474/237, 238, 242, 264, 265

[56] References Cited

U.S. PATENT DOCUMENTS

| 4,177,687 | 12/1979 | Russ, Sr. | 474/242 |
| 4,342,561 | 8/1982 | Braybrook | 474/242 |
| 4,365,965 | 12/1982 | Russ, Sr. | 474/201 X |
| 4,457,742 | 7/1984 | Hattori et al. | 474/201 |
| 4,473,366 | 9/1984 | Cataldo | 474/201 X |

FOREIGN PATENT DOCUMENTS 573783 3/1924 France.
256918 9/1948 Switzerland.

Primary Examiner—John Petrakes
Attorney, Agent, or Firm—H. W. Oberg, Jr.; C. H. Castleman, Jr.

[57] ABSTRACT

A power transmission belt of the V-block type with polymeric portions that define frictional driving surfaces. Extended polymeric portions are oriented transversely to the belt and are deflected such that successive blocks are in pressing contact with each other.

9 Claims, 7 Drawing Figures

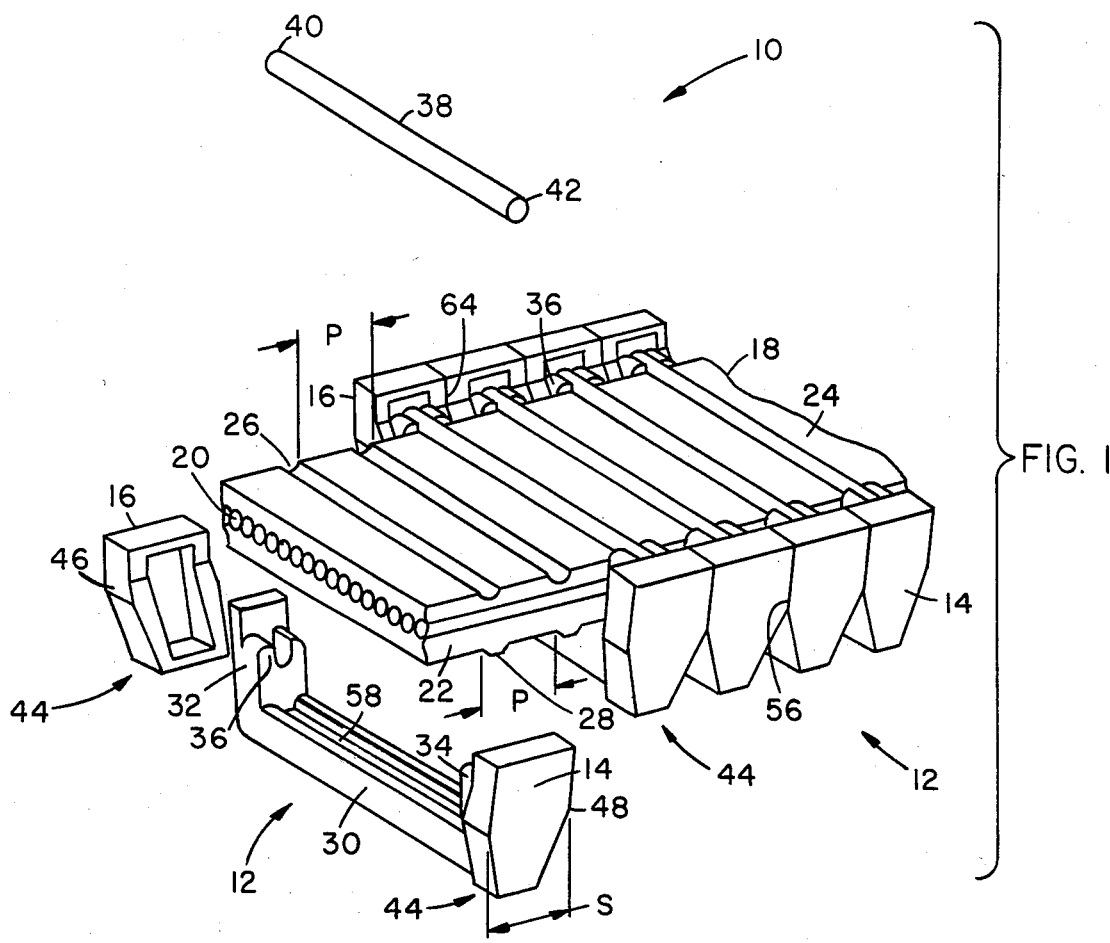
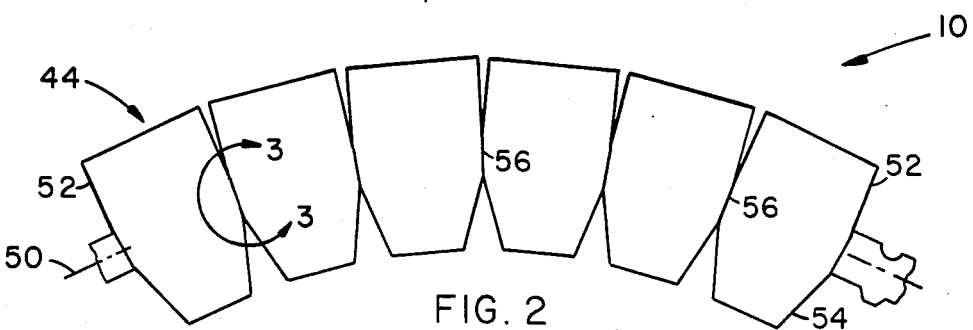
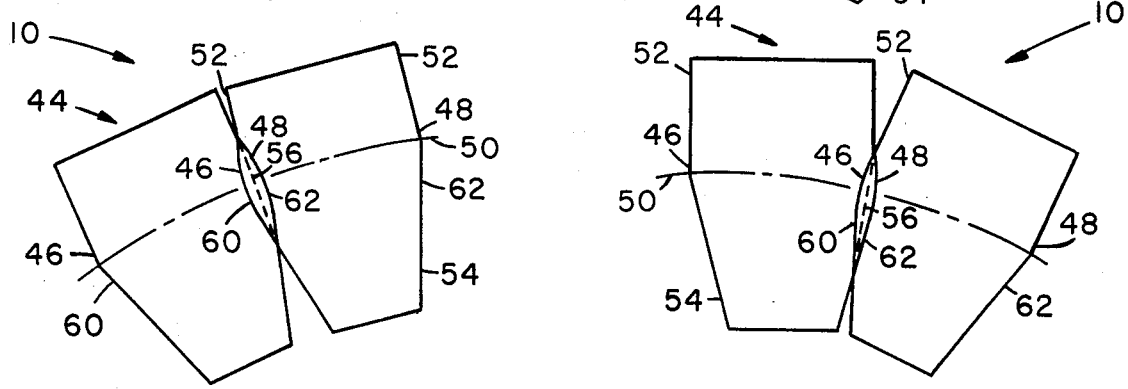

V-BELT

BACKGROUND OF THE INVENTION

The invention relates to V-belts, but more particularly, the invention relates to V-block belts.

V-block belts are extensively used as variable speed belts because their construction allows a low thickness to width ratio to accommodate desirable speed ratio changes in variable speed drives. Such belts are usually constructed with a flat band type load-carrying member that establishes an equatorial plane about which bending takes place. V-blocks are longitudinally spaced and attached to the load carrying member. Such belts usually fall within two categories. In one category of belts, V-blocks surround and slide on a metallic flat band member. The V-blocks are made of a high modulus material that directly contacts conical sides of a pulley without the aid of a polymeric friction wear surface. In such belts, power is transmitted by successive blocks pushing against each other. An example of such a belt appears in U.S. Pat. No. 4,457,742.

Belts in a second category have V-blocks attached directly to a flat band-type load-carrying member. Such belts transmit power by the blocks pulling and tensioning the load-carrying member. One type of belt in this category has V-blocks clamped to the load-carrying member. The blocks may be of leather and extend transversely of a load-carrying member and define a friction wear surface. An example of such a belt is shown in French Pat. No. 573,783. Another belt where the friction wear surface and the transverse portion of the block are of a low modulus material such as leather or rubber is shown in Swiss Pat. No. 256,918. Belts of this type have limited power transmission because the wear-resistant surface and transverse member are made of the same low modulus materials such as leather.

Another type of belt in the second category has V-blocks which each have a high modulus reinforcement such as of metal or plastic that surrounds and supports a load-carrying member. Wear pads made from a polymeric material are attached to the reinforcement at oppositely facing V-sides. Such belts are capable of transmitting much higher power than the previously described belts. An example of a V-block belt having a high modulus reinforcement is shown in U.S. Pat. No. 4,177,687. The belt of the invention is directed to belts of this second type.

The art of the exemplary categories teaches or shows belts with V-blocks that have transversely oriented surface portions that are in contact with each other.

As with all conventional V-belt drives, power is transmitted between a driver pulley and a driven pulley by means of belt tension where $T_1$ is commonly referred to as the tight side belt tension and $T_2$ is commonly referred to as belt slack side tension. The difference between $T_1$ and $T_2$ ($T_1-T_2$) is representative of a force acting at a changing pulley radius for transmitting torque at the driver and driven pulleys. FIGS. 5 and 6 are schematical representations of a V-belt drive with superimposed radial plots of belt tension about a driver 6 and driven 8 pulleys for a speed down condition (FIG. 5) and a speed up condition (FIG. 6). The distribution of belt tension is drastically different between the driver and driven pulleys even though both pulleys are exposed to the same tight side tension $T_1$ and slack side tension $T_2$. Belt tension at the driver pulley remains substantially high throughout the total arc of belt contact from the point where the belt enters the pulley to the point where the belt exits the pulley as it is released to the slack side tension. In contrast, belt tension at the driven pulley starts out at the low slack side tension and almost exponentially increases to the tight side tension level where the belt exits. This happens for both the speed down and speed up cases. The maximum tensile and shear loads between the belt and a pulley are imposed just before the belt exits the driven pulley.

A V-block belt undergoes a similar tension change between slack side tension and tight side tension except that each V-block must carry an incremental portion of the increased tension at the driven pulley. The V-block that is just ready to exit the driven pulley may be exposed to higher shear forces in comparison to all of the other V-blocks that are engaged with either pulley. FIG. 7 illustrates the incremental shear forces for successive blocks in comparison to a conventional, continuous belt. The large difference in shear forces between V-blocks does not present a significant problem for the low horsepower belts (i.e., 10 HP or less). However, the large differences in shear loading of the V-blocks and tension loading between V-blocks for high horsepower belts (i.e., 20 HP or more) presents a loading problem between the exiting V-block and pulley, and a load transferring problem between the V-block and the load-carrying member. This invention is directed to improving the power transfer between a V-block belt and a pulley.

SUMMARY OF THE INVENTION

In accordance with the invention, a V-block belt is provided that exhibits improved performance because of what is believed to be an improved load distribution between a pulley and the belt, and the V-blocks and a generally flat belt type load-carrying member.

V-blocks are successively attached to a generally flat band load-carrying member at some nominal pitch spacing. Each block has a high modulus reinforcement to which is attached two polymeric portions that each form an oppositely facing V-side with a frictional driving surface. Each polymeric portion also has two oppositely facing and spaced apart reactive surface portions near an equatorial bending plane of the belt. The reactive surface portions are oriented transversely in relation to the flat belt type load-carrying member and each reactive surface portion is partially deflected and in pressing contact with each other.

An object of the invention is to provide a V-block belt that exhibits improved performance due to an improved distribution of loads at the V-blocks.

This and other advantages of the invention will be apparent after reviewing the drawings and description thereof wherein:

FIG. 1 is a partially exploded isometric view of a segment of a V-block belt of the invention;

FIG. 2 is a partial side view of the belt of FIG. 1 but showing the belt during bending;

FIG. 3 is an enlarged view taken along the line 3—3 of FIG. 2 showing how reactive surface portions are partially deflected;

FIG. 4 is a view similar to FIG. 3 but showing a different deflection of the reactive surface portion.

DESCRIPTION OF PREFERRED EMBODIMENT

Figure 5:
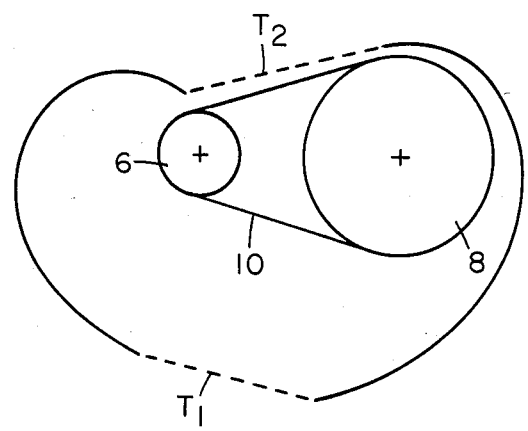
FIG. 5 is a schematical representation of a V-belt drive showing variable speed pulleys in a speed down ratio with a radial plot of local belt tensions superimposed around driver and driven pulleys for a conventional V-belt without V-blocks.
Figure 6:
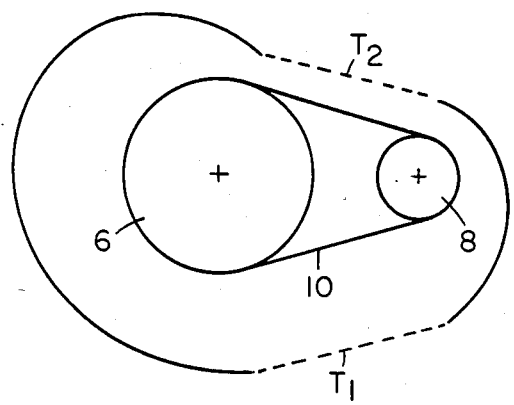
FIG. 6 is a view similar to FIG. 5 but showing the pulleys positioned at a speed up ratio with a radial plot of local tensions superimposed around the driver and driven pulleys.

Referring to the Figures, a power transmission belt 10 of the V-block, variable speed type is provided. A plurality of spaced V-blocks 12 with oppositely facing frictional driving surfaces 14, 16 on the V-sides of the blocks are attached to a generally flat belt type load-carrying member 18. The load-carrying member is made in known fashion and may include a tensile reinforcement of spirally wound cord 20 or the like that is sandwiched between predominantly polymeric layers 22, 24 that may include grooves 26 or ribs 28 that facilitate attachment of the V-blocks.

Each V-block has a reinforcement that may be in the form of a generally U-shaped member that has a lower beam member 30 integrally innerconnected to two spaced apart, diverging diagongal side members 32, 34. Each side member has a means 36 for retaining end portions of an upper beam member 38. End portions 40, 42 of the upper beam member may be retained to the cantilevered portion such as by welding, gluing, crimping or the like. The reinforcement may be made of any suitable material such as aluminum, steel, or plastic.

A polymeric portion 44 which defines the frictional driving surfaces is attached to each diagonal side member such as by integrally molding them thereto or by individually adhering them thereto. The polymeric portion may be made of any suitable material such as natural rubber, synthetic rubber or blends thereof, polyurethane, and may incorporate a fibrous reinforcement such as fabric or discontinuous fibers.

Each polymeric portion has two oppositely facing and spaced apart reactive surface portions 46, 48 near an equatorial bending plane 50 of the belt. The reactive surface portions are oriented transversely to the load-carrying member and generally normal to the frictional driving surfaces. That portion 52 of the reactive surfaces that extend above the equatorial bending plane established by the load-carrying member, may be substantially parallel to each other for the purpose of inhibiting belt back bending. That portion of the reactive surface extending below the equatorial bending plane converge 54 relative to each other to facilitate belt bending around a pulley. That portion of each reactive surface near the equatorial bending plane is sized and shaped such that the reactive surface portion between each successive polymeric portion is partially deflected and in pressing contact 56 against each other when the belt is fabricated.

Referring to FIG. 1, V-blocks are placed in position on the load-carrying member. The lower beam member has slot 58 sized to receive the transversely oriented rib 28 on the load-carrying member and the upper beam member 38 is sized to fit within the slot 26 of the load-carrying member. The upper beam member is attached to the diagonal sides of the reinforcement such as by crimping the means 36. The V-blocks have any suitable configuration and may be attached to a load carrying member in any suitable manner such as the configuration and attachment as described in U.S. Pat. No. 4,177,687.

In the illustrative embodiment, a spacing S between the undeflected reactive surface portions of each elastomeric portion is greater than the nominal pitch spacing P where the V-blocks attach to the load-carrying member such as the pitch spacings of the slots or ribs. The reactive surface portions between each successive polymeric portion are partially deflected during assembly so that they are in pressing contact 56 with each other. The reactive surface portions are so shaped to ensure some deflection and pressing contact.

Referring to FIGS. 3 and 4, undeflected reactive surface portions 60, 62 are shown overlaying each other and the deflected and pressing contact condition 56 is shown by a dotted line. As illustrated by FIG. 3, the deflection primarily occurs near the equatorial bending plane 50. FIG. 4 shows that the deflected surface portions may be somewhat below the equatorial bending plane. There may also be deflection and pressing contact 64 of the reactive surface portion above the equatorial plane when the belt is in a straight condition as in FIG. 1. Such extended surface portions above the equatorial plane also define a means for inhibiting belt back bending. A deflection of each surface portion near the equatorial bending plane from about 0.015 mm to about 0.55 mm has proven satisfactory for a V-block whose reactive surfaces are spaced approximately 12.2 mm apart. Such a deflection of each surface portion corresponds from about 0.1 to about 4.3 percent of the undeflected spacing between reactive surfaces. In comparison to pitch spacing, the spacing between undeflected elastomeric surface portions is from about 0.2 to about 8.7 percent of the pitch spacing. The load-carrying member is slightly tensioned when the reactive surface portions are in pressure contact with each other.

The advantages of the invention are illustrated by comparing it to a similar belt where there is no pressure contact between successive V-blocks.

Example 1

A belt without pressure contact between successive V-blocks is constructed with the following characteristics:

Top width: 52.3 mm
Thickness: 20.8 mm
Load-carrying tensile member: Rubber reinforced with a tensile reinforcement of spirally wound aramid cord
Friction drive surface polymer: Rubber-fiber composite
Angle between diverging sides: 30 degrees
Length: 1133 mm
No. of blocks: 97
Block reinforcement: Aluminum The belt of Example 1 operated for a period of 20.7 hours under the following test conditions:

Sheave pitch diameter: 142 mm
Speed: 1750 rpm
Horsepower: 32

Example 2

To illustrate the effectiveness of a belt having blocks partially deflected and in pressing contact against each other is constructed in accordance with the invention:

Top width: 52.3 mm
Thickness: 20.8 mm

Load-carrying tensile member: Rubber reinforced with a tensile reinforcement of spirally wound aramid cord
Friction drive surface polymer: Rubber-fiber composite
Angle between diverging sides: 30 degrees
Length: 1133 mm
No. of blocks: 97
Block reinforcement: Aluminum
Deflection of reactive surface portion: 0.18 mm The belt of Example 2 was subjected to the following test condition for a period of 500 hours:
Sheave pitch diameter: 142 mm
Speed: 1750 rpm
Horsepower: 38

The belt of Example 2 operated approximately 24 times longer than the belt of Example 1 while carrying approximately 13 percent more horsepower at the same speed. It is theorized that the improved performance may be attributed to improved alignment of the blocks, improved load distribution between the blocks, a smaller degree of rocking of the blocks, or some combination thereof.

Figure 7:
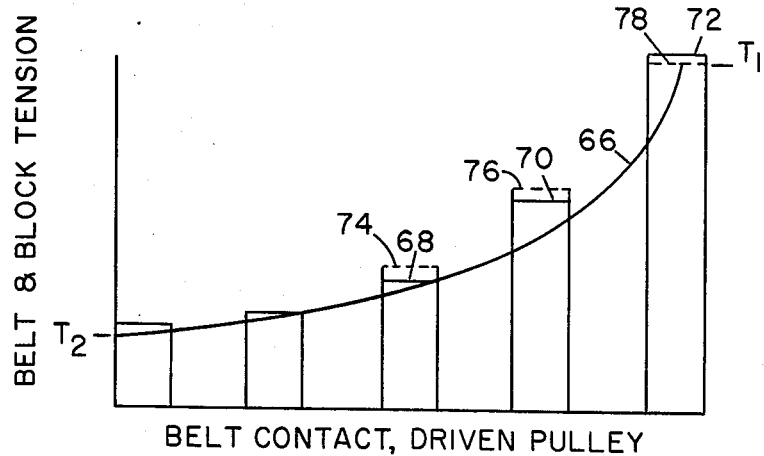
FIG. 7 is a plot of the FIG. 5, driven pulley belt tension in rectangular coordinants over which are imposed local tensions of a V-block belt.

The improved load distribution may be somewhat explained in reference to FIG. 7 which shows a theoretical tension rise 66 for a conventional belt (i.e., without V-blocks) compared to incremental tensions 68, 70, 72 of a V-block belt while in contact with a driven pulley. It is believed that there is lower incremental tensions because of better distribution 74, 76, 78 between the two or three successive blocks which are exiting the driven pulley. It should here be noted that while the prior art shows touching of V-blocks, none of the art teaches belts where part of an elastomeric portion are deflected so that successive blocks are in pressing contact against each other.

The foregoing description is made for purpose of illustration only and is not intended to limit the scope of the invention which is to be determined from the appended claims.

What is claimed is:

1. In a power transmission belt of the type having a plurality of V-blocks successively attached to a generally flat belt type load-carrying member at a nominal pitch spacing, each block having a high modulus reinforcement and two polymeric portions that each form an oppositely facing V-side with a frictional driving surface extending above and below an equatorial bending plane of the load-carrying member, successive blocks tilting relative to each other as the belt bends such that portions of successive blocks above the equatorial bending plane move away from each other, and portions of successive blocks below the equatorial bending plane move toward each other, the improvement comprising:

each polymeric portion having two oppositely facing and spaced apart reactive surface portions near the equatorial bending plane that are transversely oriented to the load-carrying member, the reactive surface portions between each successive polymeric portion is partially deflected and in pressing contact against each other.

2. The power transmission belt as claimed in claim 1 wherein each reactive surface portion is deflected from about 0.1 percent to about 4.3 percent.

3. The power transmission belt as claimed in claim 1 wherein each reactive surface portion is deflected from about 0.015 mm to about 0.55 mm.

4. The power transmission belt as claimed in claim 1 wherein each reactive surface portion extends above the equatorial plane and defines a means for inhibiting belt back bending.

5. The power transmission belt as claimed in claim 4 wherein the extended surface portions between each successive polymeric portion are partially deflected and in pressing contact against each other when the belt is straight.

6. The power transmission belt as claimed in claim 1 wherein the pressing contact between reactive surface portions is greatest below the equatorial bending plane as the belt bends.

7. The power transmission belt as claimed claim 1 wherein a spacing between undeflected reactive surface portions of each elastomer portion is greater than the nominal pitch spacing.

8. The power transmission belt as claimed in claim 7 wherein the spacing is from about 0.2 to about 8.7 percent of the pitch spacing.

9. The power transmission belt as claimed in claim 1 wherein the load-carrying member is tensioned when the reactive surface portions are in pressure contact with each other.

* * * * *